July 19, 1955 E. VENIS 2,713,435
SUPPORT MEMBER FOR VACUUM JACKETED FLASKS
Filed Oct. 17, 1951
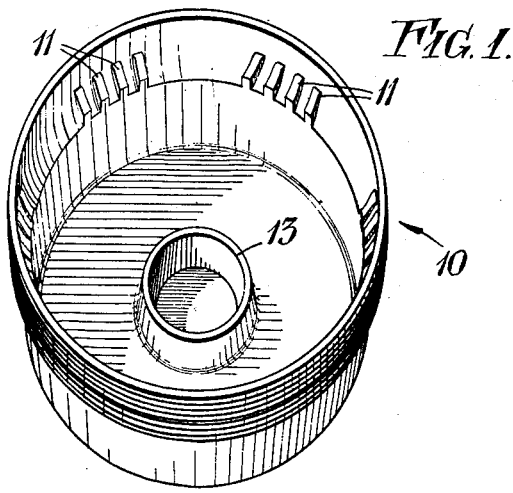
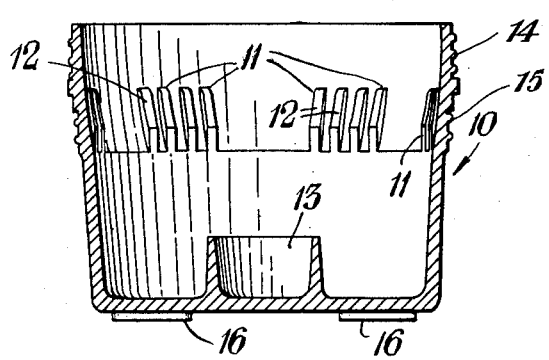
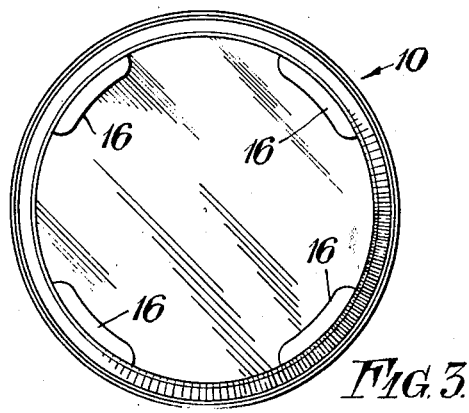
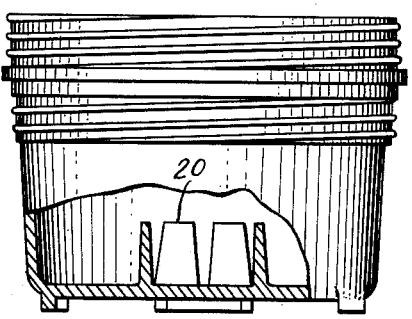
INVENTOR
ERNEST VENIS
By:
Hauntine, Lake & Co.
AGENTS

United States Patent Office 2,713,435
Patented July 19, 1955

2,713,435

SUPPORT MEMBER FOR VACUUM JACKETED FLASKS

Ernest Venis, Hatch End, England, assignor to The British Vacuum Flask Company Limited, London, England, a British company Application October 17, 1951, Serial No. 251,757

Claims priority, application Great Britain November 27, 1950

2 Claims. (Cl. 215—13)

This invention relates to vacuum jacketed flasks of the kind generally employed for conserving heated beverages, liquids and the like and wherein the flask itself is housed within an outer casing or body which is of cylindrical or substantially cylindrical form and has one end thereof so formed as to allow of the application thereto of a cup or drinking vessel, the latter being readily removable and replaceable and, when in position on said casing or body, adapted to shroud the normally stoppered mouth of the flask and to serve as an additional closure therefor.

According to the invention in a flask of the kind referred to that end of the outer casing or body opposite that to which the cup or drinking vessel is applied, is closed by a removable cup shaped closure element formed of a material possessing a degree of flexibility or resilience such as Polythene said closure element being formed internally with suitably shaped ribs, projections or the like which are relatively so formed and arranged as to accommodate and to provide a seating for the lower or closed end of the flask itself. Preferably the closure element will be formed externally with screw threads or other means so that it may be secured to the casing or body and so that a second cup or drinking vessel applied over said element may be secured in position thereon.

In order that the said invention may be readily understood and carried into effect the same will be hereinafter more fully described with reference to the accompanying drawings in which:

Figure 1 is a perspective view of a cup shaped closure element;

Figure 2 is a cross-sectional view of the element shown in Figure 1;

Figure 3 is a plan view of the underside or base of the element shown in Figures 1 and 2;

Figure 4 shows the element partially broken away to illustrate a structural modification.

As indicated above the invention is concerned with vacuum jacketed flasks of the kind wherein the flask itself, which is formed with a conventionally stoppered outlet or mouth at one end, is housed within an outer casing or body of cylindrical or substantialy cylindrical form, that end of the casing or body adjacent the outlet or mouth of the flask being so formed as to allow of the application thereto of a cup or drinking vessel which latter, when in position, is adapted to shroud said outlet or mouth and to serve as an additional closure therefor.

The cup shaped closure element, illustrated in the drawings and indicated generally by 10 is adapted to be applied to that end of the outer casing or body opposite that to which the cup or drinking vessel is applied said element being adapted when in position to close the lower end of said casing or body and thereby to house or enclose the base or lower portion of the flask. The closure element is formed of a synthetic resinous material possessing a degree of flexibility or resilience such for example as Polythene. Furthermore as will be clearly seen from Figure 2, said closure element is so formed that the upper part thereof (it being assumed that said element is standing on its base on a horizontal surface) will be of slightly increased diameter as compared with the lower part. Disposed at spaced points around the inner surface of the closure element and in that part of increased diameter is a number of sets of vertically extending ribs or the like 11. For example as indicated in the drawings, six such sets may be spaced equidistantly around the inner surface of said element each set comprising four ribs arranged in parallel relationship. Those portions 12 of the outer faces of the ribs are curved to conform substantially to the curvature of the lower portion of the flask thereby to provide a seating for the latter the arrangement being such that when the closure element is applied to the outer casing or body the ribs 11 will contact the lower portion of the flask and will serve to support the latter. Preferably the ribs are also so formed that the ends thereof will merge into the internal surface of the closure element. The closure element is additionally formed internally with an upstanding ring or collar 13 which is disposed centrally of the base thereof and is adapted to provide an additional seat or support for the base of the flask.

Externally the closure element is formed at its upper part with two sets of screw threads 14 and 15 disposed one above the other, the set 14 providing means whereby said element may be secured to the lower end of the casing or body while the set 15 provides securing means for a second cup or drinking vessel which is adapted to be applied over said closure element to house or enclose the same. Finally the closure element is also formed externally at its base with a number of spaced ribs, projections or the like 16 adapted to constitute supporting feet or the like. In the embodiment illustrated four ribs or the like 16 are provided spaced equidistantly around the base adjacent the periphery thereof.

As indicated above the closure element is formed of a synthetic resinous material such as Polythene and therefore it may conveniently be produced by a moulding process.

If desired the upstanding ring or collar may be of castellated form (as shown in Figure 4), i. e. may comprise a number of separate upstanding lugs or projections 20 so arranged as together to provide a circular formation. The casteliated form is particularly advantageous since it increases the resiliency of base support provided for the flask. Again instead of providing screw threads such as are indicated at 14 and 15 on the exterior of the element any other suitable means may be provided to co-operate with corresponding means on the casing or body and on the second drinking cup or vessel in order to provide for easy or rapid connection and disconnection of the parts.

I claim:

1. For application to the base or lower end of an outer casing serving to house a vacuum jacketed flask having a hemispherical base, a cup shaped closure element having a peripheral upstanding wall formed with an upper portion of increased diameter, such element being formed of a synthetic resinous material possessing a degree of resilience, a plurality of inwardly directed ribs formed in the inner surface of said upper portion of the peripheral upstanding wall of said element, such ribs being arranged in groups which are spaced equidistantly apart around the inner surface of said element with the ribs of each group extending substantially vertically and merging into the inner surface of the peripheral wall below said upper portion, said ribs having curved outer faces adapted to conform substantially to the curvature of the base end of the flask thereby to provide a seating for the latter and an upstanding collar disposed centrally of the base of said element and adapted to provide an additional seat or support for the base of the flask.

2. For application to the base or lower end of an outer casing serving to house a vacuum jacketed flask having a hemispherical base, a cap shaped closure element having a peripheral upstanding wall formed with an upper portion of increased diameter, such element being formed of a synthetic resinous material possessing a degree of resilience, a plurality of inwardly directed ribs formed on the inner surface of said upper portion of the peripheral upstanding wall of said element, such ribs being arranged in groups which are spaced equidistantly apart around the inner surface of said element with the ribs of each group extending substantialy vertically and merging into said inner surface of the peripheral wall below said upper portion, said ribs having curved outer faces adapted to conform substantially to the curvature of the base end of the flask thereby to provide a seating for the latter and a plurality of upstanding lugs disposed centrally of the base of said element and being arranged in circular formation to provide a castellated cushion for the base of the flask.

References Cited in the file of this patent

UNITED STATES PATENTS

| | | |
|---|---|---|
| 922,364 | Van Wye | May 18, 1909 |
| 1,063,351 | Hyatt | June 3, 1913 |
| 1,121,349 | Goss | Dec. 15, 1914 |
| 1,855,039 | Wetmore | Apr. 19, 1932 |
| 1,969,486 | Kurz | Aug. 7, 1934 |
| 2,077,215 | Conner | Apr. 13, 1937 |
| 2,115,654 | Swofford | Apr. 26, 1938 |
| 2,410,179 | Nygren | Oct. 29, 1946 |
| 2,466,875 | Brandt | Apr. 12, 1949 |
| 2,487,400 | Tupper | Nov. 8, 1949 |

FOREIGN PATENTS

| | | |
|---|---|---|
| 304,984 | Great Britain | Jan. 21, 1929 |
| 455,426 | Great Britain | Oct. 20, 1936 |